(12) United States Patent
Evans et al.

(10) Patent No.: US 6,431,850 B1
(45) Date of Patent: Aug. 13, 2002

(54) COMPOSITE CAUL SHEET WITH INTEGRAL SEAL USED IN THE FABRICATION OF LIGHTWEIGHT AIRFOILS AND METHOD OF MAKING

(75) Inventors: Charles Richard Evans, Cincinnati; Robert Paul Tyler, Harrison, both of OH (US)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 09/637,433

(22) Filed: Aug. 11, 2000

(51) Int. Cl.[7] ............................................. B29C 70/44
(52) U.S. Cl. ...................... 425/470; 425/390; 425/403; 425/DIG. 44
(58) Field of Search ................................ 425/470, 389, 425/403, DIG. 44, 390, DIG. 47, 110, 127, 129.1; 264/313, 267

(56) References Cited

U.S. PATENT DOCUMENTS 5,665,301 A * 9/1997 Alanko ........................ 264/571
6,282,786 B1 * 9/2001 Evans et al. ............. 29/889.72
6,290,895 B1 * 9/2001 Wang et al. ................ 264/510

* cited by examiner

*Primary Examiner*—James P. Mackey
*Assistant Examiner*—Joseph S. Del Sole
(74) *Attorney, Agent, or Firm*—David L. Narciso; McNees Wallace & Nurick; Carmen Santa Maria

(57) ABSTRACT

A flexible tool that fits over the pressure or concave side of a metallic airfoil that includes a lightweight material component for a gas turbine engine during the fabrication of the airfoil. The metallic fan airfoil includes pockets or cavities that have been machined into the airfoil in order to reduce the weight of the airfoil. The tool is a flexible body manufactured from sheets of composite material and includes an integral elastomeric seal. The tool is placed over the airfoil and forms a seal against the pressure side of the airfoil so that lightweight resin can be injected into the pockets and retained in position during curing. The flexible tool is formed by laying up thin sheets of composite material that includes fiber over a metallic master tool after partially cured elastomeric material is placed inside a marking corresponding to the airfoil perimeter. The metallic master tool also includes slot positions corresponding to preselected positions, that form integral projections which allow the flexible tool to be correctly assembled and sealed against the airfoil.

11 Claims, 6 Drawing Sheets

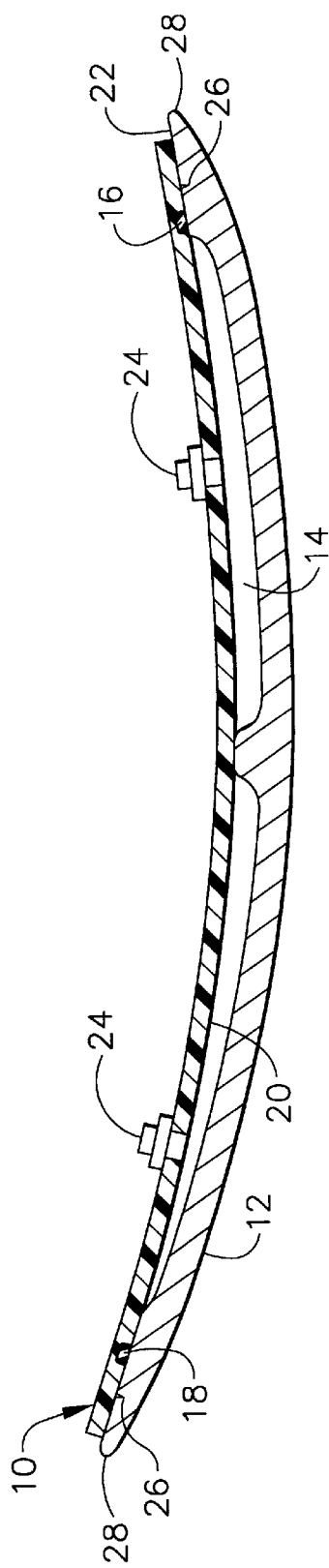
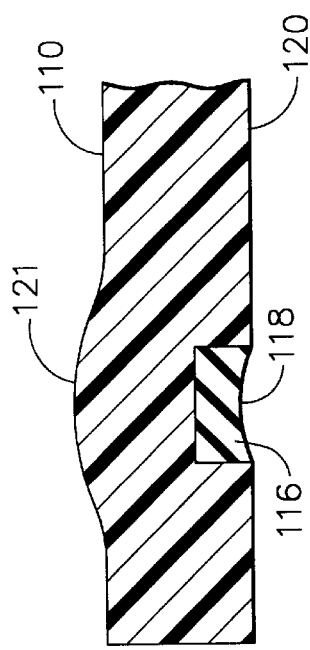
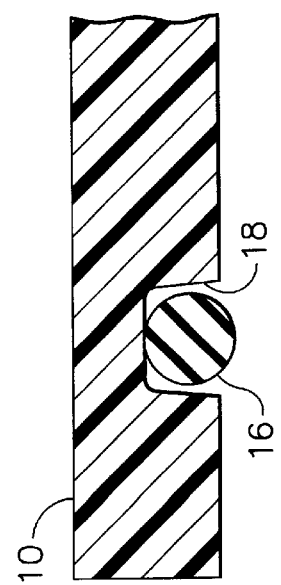
FIG. 1 (PRIOR ART)
FIG. 2 (PRIOR ART)
FIG. 3

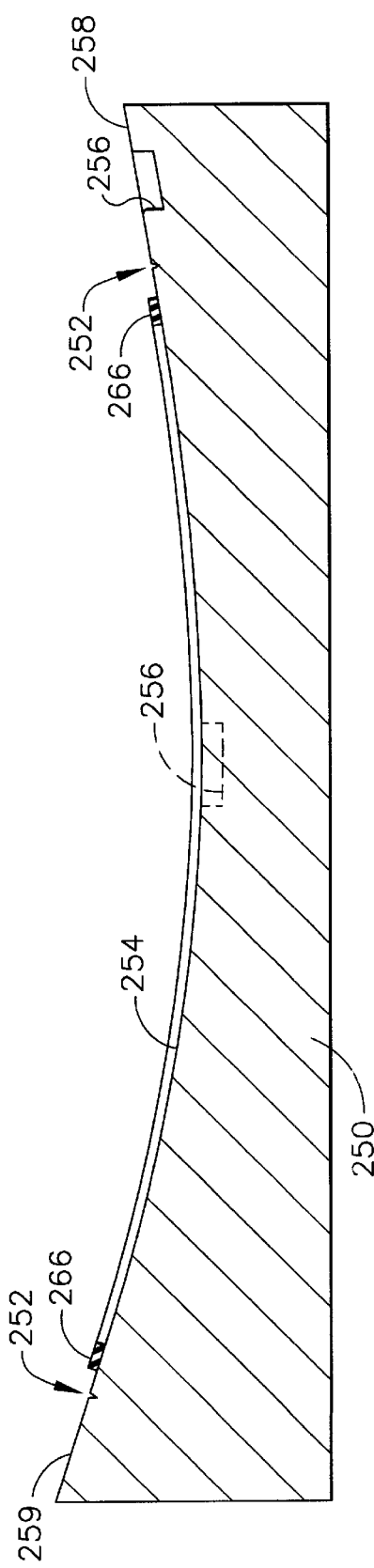
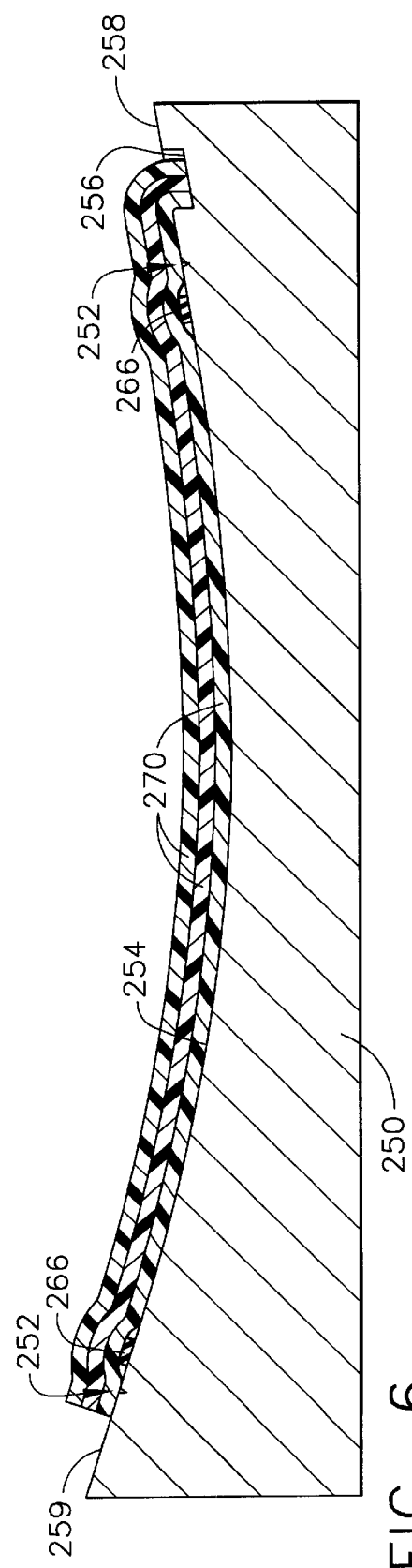
FIG. 5
FIG. 6

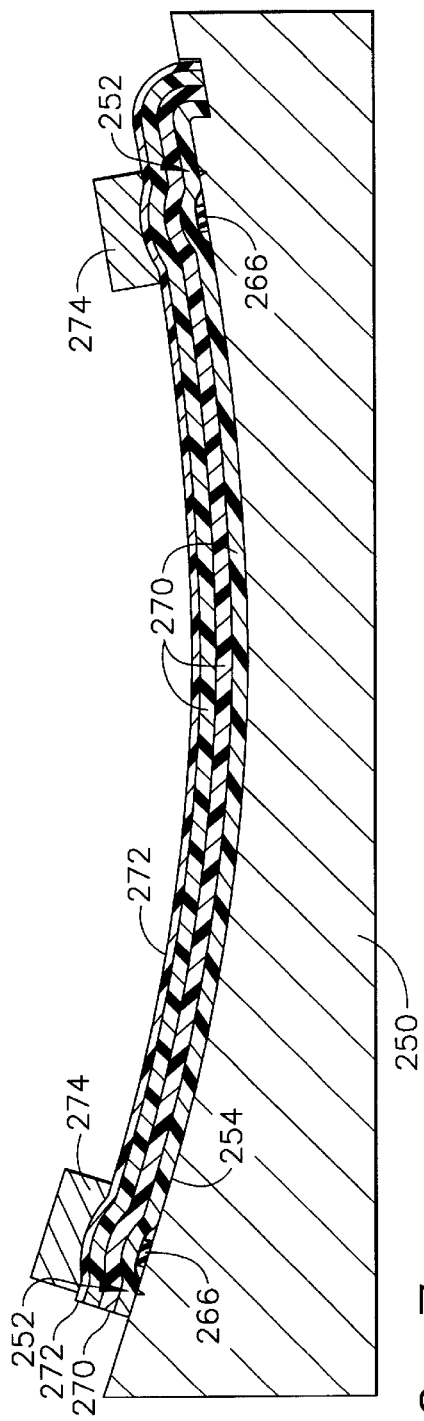
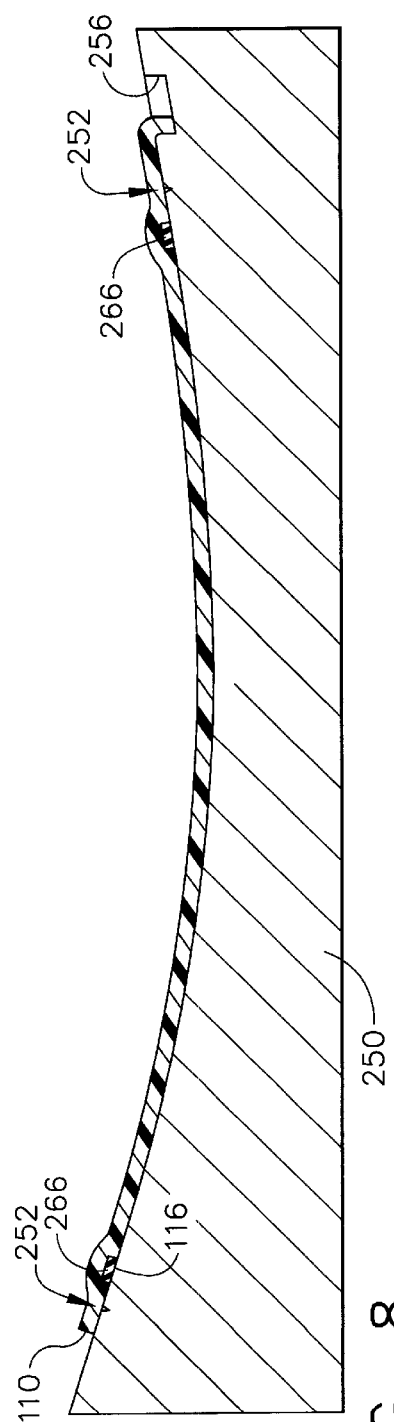
FIG. 7
FIG. 8

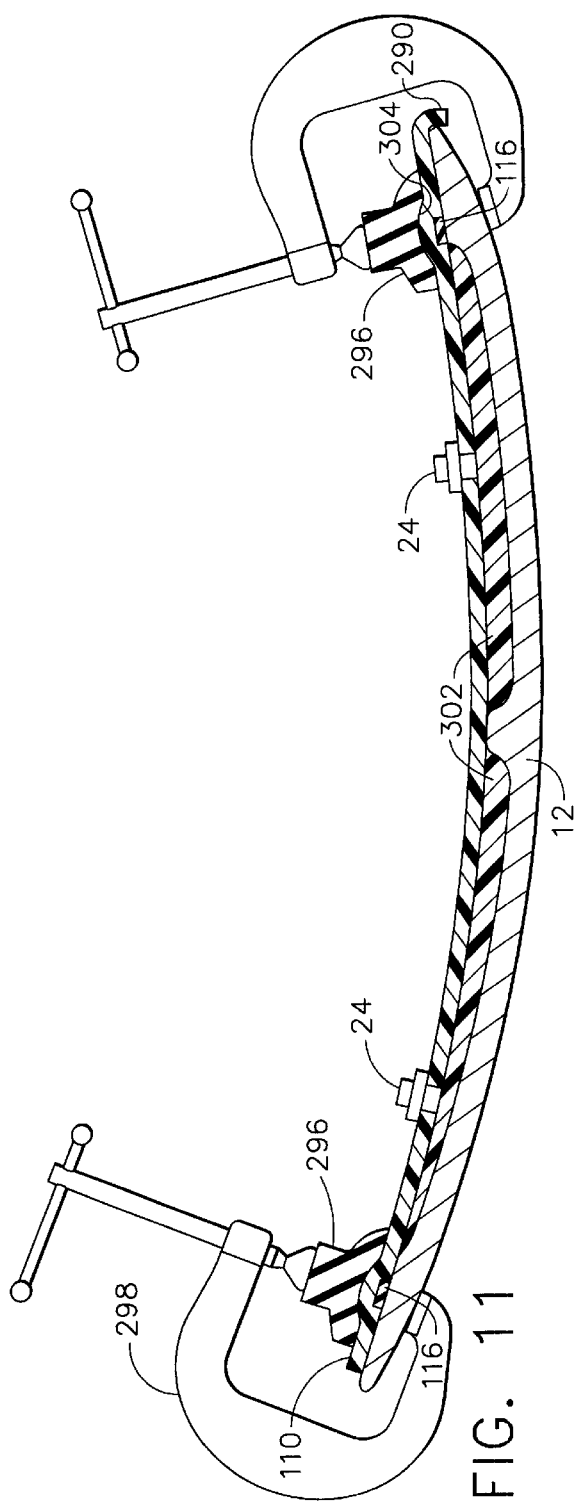
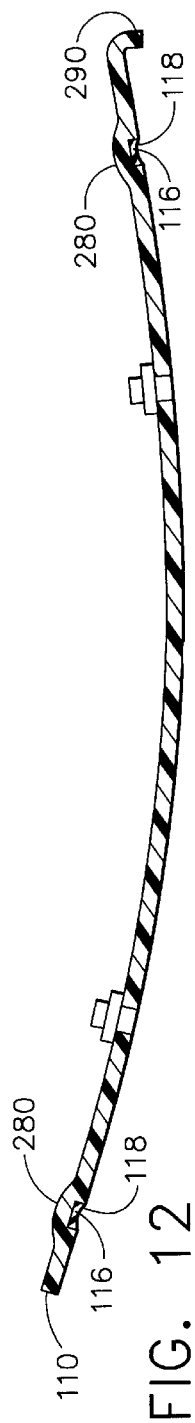
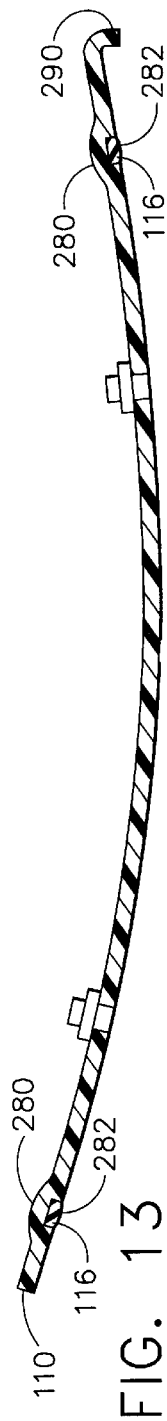
FIG. 11
FIG. 12
FIG. 13

COMPOSITE CAUL SHEET WITH INTEGRAL SEAL USED IN THE FABRICATION OF LIGHTWEIGHT AIRFOILS AND METHOD OF MAKING

FIELD OF THE INVENTION

The present invention relates generally to tooling used to manufacture lightweight fan blades used in gas turbine engines.

BACKGROUND OF THE INVENTION

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive a front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have airfoils each including an airfoil portion attached to a shank portion. Rotor blades are those airfoils which are attached to a rotating gas turbine rotor disc. Stator vanes are stationary airfoils which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counter-rotating "stator" vanes are also known.

Conventional airfoil designs used in the compressor section at the engine typically have airfoil portions that are made entirely of metal, such as titanium, or are made entirely of a composite. A "composite" is defined to be a material having any (metal or non-metal) fiber filament embedded in any (metal or non-metal) matrix binder, but the term "composite" does not include a metal fiber embedded in a metal matrix. The term "metal" includes alloys such as titanium Alloy 6-2-4-2. An example of a composite is a material having graphite filaments embedded in an epoxy resin.

The all-metal blades, including costly wide-chord hollow blades, are heavier in weight which results in lower fuel performance and require sturdier blade attachments, while the lighter all-composite blades are more susceptible to damage from bird ingestion events. Known hybrid blades include a composite blade having an airfoil shape which is covered by a surface cladding (with only the blade tip and the leading and trailing edge portions of the surface cladding comprising a metal) for erosion and foreign object impacts. The fan blades typically are the largest (and therefore the heaviest) blades in a gas turbine aircraft engine, and the front fan blades are usually the first to be impacted by foreign objects such as birds.

Recent improvements have resulted in lighter-weight gas turbine blades, and especially a gas turbine aircraft engine fan blade that is comprised of a combination of metal and lightweight materials. These blades have been made lighter by removing metal from the pressure side of the blade. In order to retain the aerodynamic characteristics of the blade, the removed metal is replaced by the lightweight material. Restoring the aerodynamic characteristics to the blade by adding the lightweight material to replace the removed metal involves the use of specialized tooling. However, the specialized tooling that includes a special caul sheet currently used in the process of adding lightweight material to the pressure side of the fan blade in order to restore aerodynamic characteristics requires that an effective seal be formed against the blade pressure side by the caul sheet. The caul sheet currently used in the process of adding the lightweight material relies on an O-ring to form the seal with the pressure side of the blade. However, the O-ring can cause the caul sheet to stand off from the pressure side of the blade. The result is that there is a lack of good contact between the caul sheet and the pressure surface, and a step is formed in the molded surface of the lightweight material that can rise above the pressure surface up to the diameter of the O-ring. This step is undesirable, as it adversely affects the aerodynamics of the pressure side of the blade. It is time consuming to and very difficult to remove this step from the lightweight material, as the material is also very tough. What is needed is better method using improved tooling for adding lightweight material to a blade.

SUMMARY OF THE INVENTION

A flexible tool is formed to fit over the pressure or concave side of a metallic airfoil that includes a lightweight material component for a gas turbine engine during fabrication of the airfoil. Typically the airfoil is a metallic fan blade. The metallic fan blade includes pockets or cavities that have been machined into the blade in order to reduce the weight of the blade. The tool is a flexible body manufactured from sheets of composite material and includes an integral elastomeric seal.

The flexible tool is formed by laying up thin sheets of composite material that includes fiber over a metallic master tool. As used herein, composite material is material formed from sheets of plastic resin matrix material having a fiber reinforcement, in which the fiber reinforcement may be unidirectional or bidirectional (woven). This material is sometimes referred to as prepreg. The metallic master tool has a profile that matches the profile of the pressure side of the fan blade, but includes a plurality of slots that are located at positions that correspond to locations along the perimeter of the fan blade, that is, positions just beyond the leading edge, trailing edge or tip end. As used herein, matching the profile of the pressure side of the fan blade means that the metallic tool has a surface that substantially corresponds to the contours, dimensions and curvatures as the pressure side of a corresponding metallic fan blade that is manufactured without cavities. The slot positions correspond to preselected positions, which allow the flexible caul sheet and seal to be correctly assembled to the blade. The slot depth may vary, but need only be sufficiently deep to allow the layers of composite material to be laid into them, thus forming lugs that positively locate the flexible caul sheet when it is placed on to the concave (pressure) side of the blade.

The elastomeric material is partially cured and is placed along the tool within an area inside the outline of the blade, which is permanently marked on the tool, such as by scribing the tool surface. Thus, the elastomeric material is placed on the tool inside of markings that correspond to the perimeter of the blade. The sheets of composite material are laid up to achieve a predetermined thickness over the elastomeric material, over the tool surface in the region outlining the blade and into the slots on the tooling surface. The predetermined thickness provides a predetermined stiffness so that the flexible tool will not deform when lightweight a material is injected under pressure into the pockets of the blade beneath the tool. The tool also includes at least one injection port corresponding to a pocket or cavity so that the lightweight material can be injected through the tool into the blade pockets. Additional ports, each corresponding to a pocket, may be added as required. A surround frame for added local stiffness is assembled from sheets of composite material and is separated from the flexible tool using a TEFLON® (polytetrafluoroethylene—PTFE) film. The surround frame extends around the perimeter of the blade outline on the tooling surface so that it overlies the partially cured elastomer and the sheets of composite material.

The metallic master tool with the partially cured elastomer, the laid up composite sheets and the surround frame secured thereto is then placed in an elevated temperature atmosphere under pressure to cure the composite sheets and the elastomer to form the flexible tool. After curing, the surround frame is removed from the flexible tool, which in turn is removed from the metallic master tool. The flexible tool, which now includes an integral seal extending around its perimeter formed as the partially cured elastomer cures with the composite sheet, has a profile that matches the profile of the pressure side of the blade and can now be used to facilitate the injection of lightweight material into pockets of a fan blade by positioning the flexible tool over the fan blade and securing it into position. The integral seal is concave at room temperature to facilitate assembly of the tool to the blade, but expands on heating to form an effective seal against the blade.

An advantage of the present invention is that the problem of standoff is eliminated. Standoff, which is caused by use of an O-ring, results in poor contact between the tool and the blade, and results in a step when a flowable, curable, lightweight material is injected into the blade pockets.

Another advantage of the present invention is that a plurality of identical flexible tools can be manufactured from the metallic master tool that has an indefinite life.

Another advantage of the present invention is that the tool is more easily located on the blade, as the integral seal is concave at room temperature and the problems associated with positioning a tool having a movable O-ring that extends away from the tool surface are eliminated.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 depicts a cross section of a prior art caul sheet with an O-ring seal positioned over a fan blade having pockets, before being clamped in place;

FIG. 2 depicts a partial cross-section of a prior art caul sheet with an O-ring seal;

FIG. 3 is a partial cross-section of a caul sheet with an integral seal of the present invention;

FIG. 5 is a cross section of the metallic tool of FIG. 4 with elastomeric material applied to tool surface, along lines 5—5;

FIG. 6 is a cross section of the metallic tool of FIG. 5 after lay-up of the sheets of the composite material over elastomeric material onto the tool surface and into the slots;

FIG. 7 is a cross section of the sheets of composite material arranged over the tool of FIG. 5 with separator film and surround frame in place;

FIG. 8 is a cross section of the cured caul sheet in place on the tool of FIG. 7 prior to cooling and after removal of the separator film and surround frame;

FIG. 11 is a cross section of a caul sheet assembled to a fan blade at an elevated temperature after lightweight material has been injected into the blade pockets;

FIG. 12 is a cross section of a finished caul sheet at room temperature; and

FIG. 13 is a cross section across a lug of a finished caul sheet at an elevated temperature.

Whenever possible, the same reference numbers will be used throughout the Figures to refer to the same parts.

DETAILED DESCRIPTION OF THE INVENTION

Figure 4:
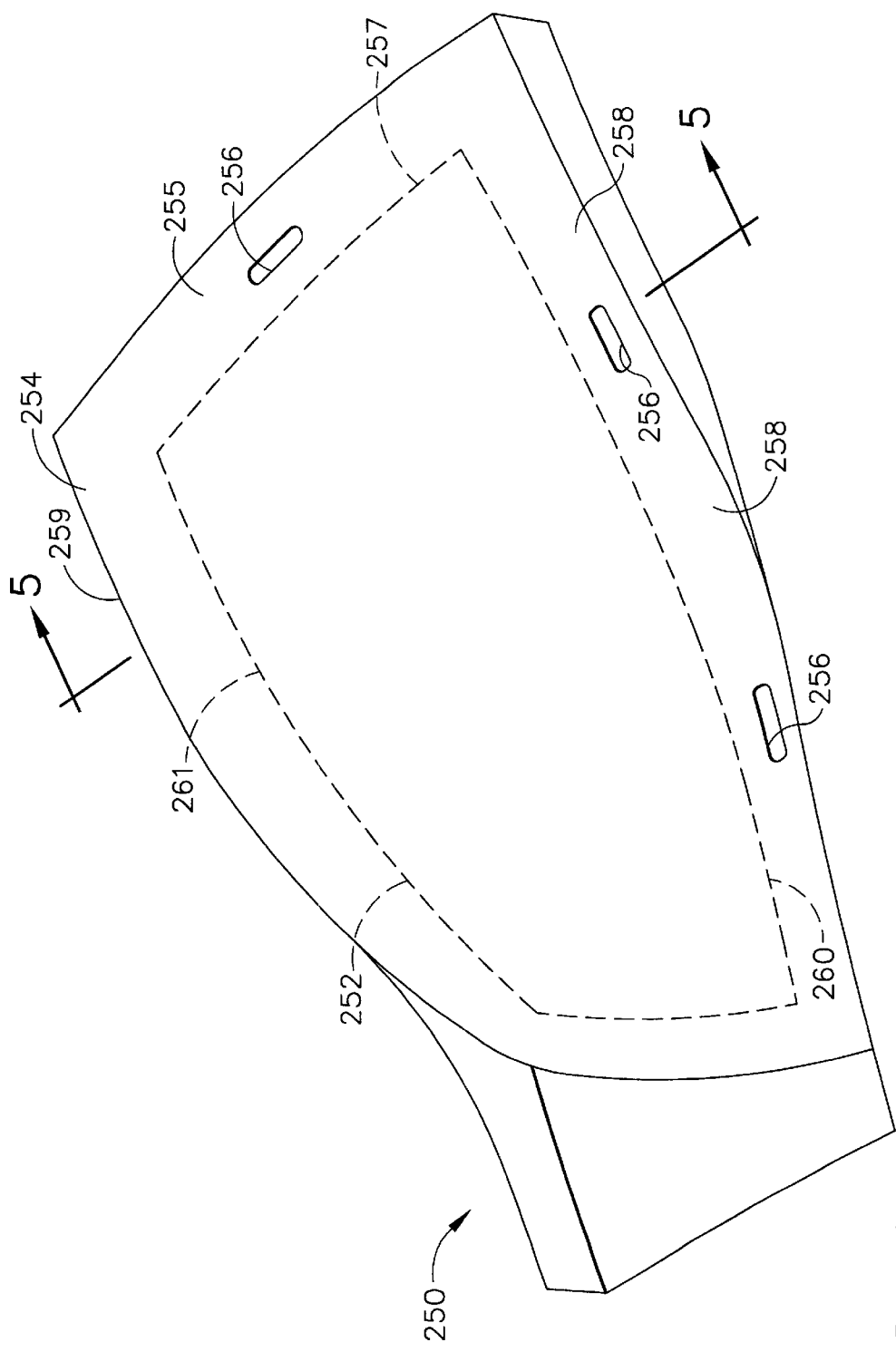
FIG. 4 is a perspective view of a metallic tool used to manufacture a caul with an integral seal.

Lightweight fan blades have been made by placing a caul sheet with an O-ring over a fan blade after the pockets have been formed in the blade. FIG. 1 depicts such a caul sheet 10 positioned over such a fan blade 12 having pockets 14. O-ring 16 fits within a slot 18 formed in the face 20 of caul sheet 10 that contacts the pressure side 22 of fan blade 12. Injector ports 24 extend through caul sheet 10 to provide access to fan blade pockets 14. Slot 18 is dimensioned so that it fits over a perimeter 26 on the pressure side 22 of fan blade 12 extending around pockets 14 and inboard a preselected dimension from the blade edge 28. FIG. 2 depicts an enlarged partial cross section of FIG. 1 showing caul sheet 10 with O-ring 16. As can be seen, O-ring 16 must be compressed into slot 18. Because O-ring 16 is a separate piece, it has a tendency to roll when placed in contact with the pressure side 22 of blade 12, making it difficult to position. Furthermore, O-ring 16 must be properly compressed by clamps (not shown) completely around perimeter 26 so that O-ring 18 is flat against pressure side 22 and substantially fills and extends across slot 18. If it is not flat against the pressure side 22, that is, if it stands off from the surface of the blade, and/or if it does not extend completely across slot 18, then a leak path exists outside the contour of the pockets that injected material will flow into. This material creates a step at the surface of the material filling the pocket that has adverse effects on the aerodynamics of the pressure side 22 of the blade 12. The step can be as large as the radius of O-ring 16. This extra material cannot be removed readily without risking damage to the blade.

A partial cross section of the caul sheet 110 of the present invention is depicted in FIG. 3. This caul sheet is comprised of composite material and includes an elastomeric seal 116. The elastomeric seal 116 is manufactured so that it is integral with caul sheet 110. At room temperature, elastomeric seal 116 has a concave contour 118 that is substantially below the contour of the surface 120 of caul sheet 110 that will contact a fan blade when assembled thereto. A smooth, convex contour 121 rises along caul sheet 110 opposite elastomeric seal 116 at room temperature.

Referring now to FIG. 4, a perspective view of a tool 250 used in manufacturing caul sheet 116 is depicted. Tool 250 is a replica of a solid fan blade surface without pockets 14, similar to blade 12 depicted in FIG. 1. Except as noted, it has the same profiles and contours of the pressure side of such a blade. Tool 250, however, is slightly wider and slightly longer than a blade. A scribe line 252 is placed along surface 254 of tool 250. Scribe line 252 indicates the edge of a fan blade of a preselected design. Portions of tool surface 254 extend beyond scribe line 252. Tip portion 255 of tool 250 extends beyond the portion of scribe line 257 indicative of the tip of a fan blade, while leading edge portion 258 and trailing edge portion 259 extend beyond the leading edge portion of the scribe line 260 and trailing edge portion of scribe line 261. Tool 250 is slightly larger than an actual fan blade of the preselected design. Tool 250 includes slots 256 at three positions in a preferred embodiment that are located in the leading edge portion 258 and the tip portion 256 of the tool outside of scribe line 252. Depending on the blade design, tool 250 may include more slots 256 and the slots may be located at various positions, including along the trailing edge if desired. However, at least two slots 256 are required.

Referring now to FIG. 5 which is a cross section of FIG. 4 along lines 5—5, a continuous strip of partially cured elastomeric material 266 of preselected crosssection is laid on surface 254 of tool 250 inside of the perimeter of scribe line 252. After elastomeric material 266 is placed onto tool 250, a plurality of sheets of composite material 270 are placed over tool 250 in contact with surface 254 and over elastomeric material 266 as shown in FIG. 6. The elastomeric material is preferably cut precisely to fit over the scribe line 252 with protrusions to fit into each of slots 256. However, the sheets of composite when placed on surface 254 may extend beyond scribe line 252 and may be trimmed to the required size in a subsequent operation. Sheets of composite material 270 are laid into slots 256, one of which is shown in FIGS. 5–8. The composite sheets 270 in slots 256, when cured, form integral projections extending substantially perpendicular to the finished flexible tool or lugs that provide a positive location mechanism for caul sheet 110 when it is fitted to a blade. Tool 250 may be made of any material that can withstand elevated temperatures as will be explained. In a preferred embodiment, the material of choice is a metal capable of withstanding elevated temperatures, and the preferred metals are aluminum and its alloys.

Partially cured elastomeric material 266, when fully cured, must be capable of being reheated a plurality of times without affecting the properties of the elastomeric material, and when cured, must be capable of forming a seal against the blade surface at elevated temperature and must be compatible with composite material. The composite material 270 used to form the caul body must be capable of being layed up on a tool used to form the caul body and be cured to form a composite body, and must be compatible with elastomeric material 266.

The cured composite body in the form of a caul sheet must be flexible enough to accommodate the permissible variations in geometry from blade-to-blade when clamped in position, yet must be sufficiently stiff that when lightweight filler material is injected into fan blade pockets 14, there is no deformation in the surface of the caul sheet. For elastomeric material 266 to be compatible with composite material 270, there must be bonding as the materials are cured. While any elastomeric material 266 that has these properties may be used, urethane rubbers and fluorosilicone rubbers are acceptable. In the preferred embodiments, fluorocarbon rubbers such as Viton® available from E. I. Du Pont de Nemours are used. Composite material sheets that are acceptable include a matrix of epoxy reinforced by fibers. The sheets may include unidirectional fibers or woven fibers. The fibers that can be used include silicon carbide fiber, kevlar fiber, alumina or sapphire fiber, and graphite fiber. In a preferred embodiment, the sheets of composite material 270 are a carbon fiber/epoxy.

The sheets of composite material 270 are laid up to a thickness of between about 0.090–0.150 inches (0.228–0.381 cm). Each sheet or ply of composite material has a thickness of about 0.005–0.025 inches (0.013–0.064 cm). In a preferred embodiment, the thickness of the caul sheet is about ⅛ inch, about 0.120–0.130 inches (0.305–0.330 cm). As previously noted, the sheets may include woven fiber or unidirectional fiber. When sheets including unidirectional fiber are used, the sheets are placed on the tool in a quasi-tropic arrangement, that is, after the first sheet is applied, referred to as the reference sheet, at 0°, a second sheet is placed so that the fibers have an orientation of +45° to the fibers in the reference sheet, the next sheet is placed so that the fibers have an orientation of 90° to the fibers in the reference sheet, the next sheet is placed so that the fibers have an orientation of −45° to the fibers in the reference sheet, and the final sheet is placed so that the fibers are parallel to the fibers of the reference sheet. The pattern of alternating orientations is continued until the desired thickness is achieved. This quasi-tropic arrangement provides greater strength to the cured composite. While the sheet orientation pattern of 0°, 45°, 90°, (−45°) has been described, other orientation patterns may be used as desired.

After the composite sheets are laid up, as previously discussed they can be trimmed to an appropriate size. In the regions in which injector ports are located, small sheets (not shown) of composite material are cut to size and added to form the stiffening ribs and pads for the injector line adaptor at the injection ports. These additional sheets may be added in any other areas where additional strength or stability is required.

Referring back to FIG. 4, the edges of the sheets of composite material are cut so that they extend into slots 256 to form the positive location lugs for the caul sheet on the blade. The layup of composite sheets is then covered with a thin film of separator material 272 as shown in FIG. 7. The separator material may be any material that the composite matrix will not adhere to during the curing process and serves as a barrier between the composite materials and the curing bags used during the curing process, as will be explained. TEFLON® film (polytetrafluoroethylene—PTFE) has been found to be an excellent separator material.

After the separator material 272 is placed over the layup, a surround frame 274 is placed over the film. The surround frame extends around the periphery of tool 250. The purpose of the surround frame is to secure the partially cured elastomeric material in position as the sheets of composite material 270 and the elastomeric material 266 are fully cured together, and to add stiffness.

After the sheets of composite material 270 are trimmed to size, the assembly of FIG. 7 is then placed in an autoclave and cured. The assembly is bagged using a nylon bag (not shown) placed over the TEFLON® (polytetrafluoroethylene—PTFE) film 272. Both the nylon bag and TEFLON® (polytetrafluoroethylene—PTFE) extend around the slots 256 to the side of the tool opposite surface 264 to secure the layup in place. The sheets of composite material 270 and the elastomeric material 266 are cured in an autoclave at suitable temperatures and pressures to form caul sheet 110. For VITON® and carbon fiber reinforced epoxy, used in the preferred embodiment of the present invention, the material is cured in an autoclave at a temperature of about 350° F. (177° C.) at a pressure of about 50 psi for about 2 hours. Different material combinations may require different temperatures, pressures and/or times to cure properly. The curing process not only causes crosslinking of the matrix material of the composite and the partially cured elastomeric material 266, but also cross-linking occurs between the matrix material and elastomeric material 266, forming a strong bond between the elastomeric material 266 which, on curing, forms seal 116 and the matrix material so that the seal is an integral part of the caul sheet 110. FIG. 8 depicts the cured caul sheet 110 assembled to tool 250 while still hot. As cooling occurs, elastomeric material 266 contracts, causing a gap between a portion of the elastomeric material and tooling 250. Two different cross-sections of cured caul sheet 110 are depicted in FIGS. 12 and 13 to illustrate the effect of elevated temperatures on the integral seal 116. FIG. 12 illustrates a first cross section of caul sheet 110 at room temperature. At this temperature, the cross-linking between the matrix material of the composite 270 and the elastomeric material 266 restrains the elastomeric material, and concave contour 118 results as the seal contracts. Also shown is a node 280 that extends completely around the surface of caul sheet 110 formed opposite seal 116. The amount that the elastomeric material 266 projects above surface 254 of tool 250 during fabrication of caul sheet 110 determines the contour and height of node 280, with more material and a higher projection resulting in a node with a more severe contour and a higher height. FIG. 13 illustrates a second cross section of caul sheet 110 at an elevated temperature. At this temperature, about 300–350° F. (149°–177° C.), the cross-linking between the matrix material of the composite 270 and the elastomeric material 266 still restrains the elastomeric material, but convex contour 282 results as the seal expands. The cross sections of FIGS. 12 and 13 also illustrate one of lugs 290 formed by curing of the composite sheets that were placed slots 256. Each lug 290 fits over an edge of fan blade 12 along the blade perimeter, and the lugs are somewhat flexible to account for small manufacturing variations among the blades of a particular design.

Figure 9:
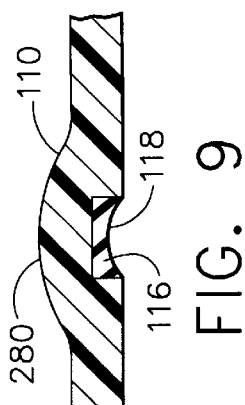
FIG. 9 is a cross section of the caul sheet at room temperature.

An enlarged view of caul sheet 110 and seal 116 is shown in partial cross-section in FIG. 9 at room temperature. On cooling the material of integral elastomeric seal contracts, but as a result of the strong bonding with the matrix material, it is restrained from contracting along its sides, so that concave contour forms.

Figure 10:
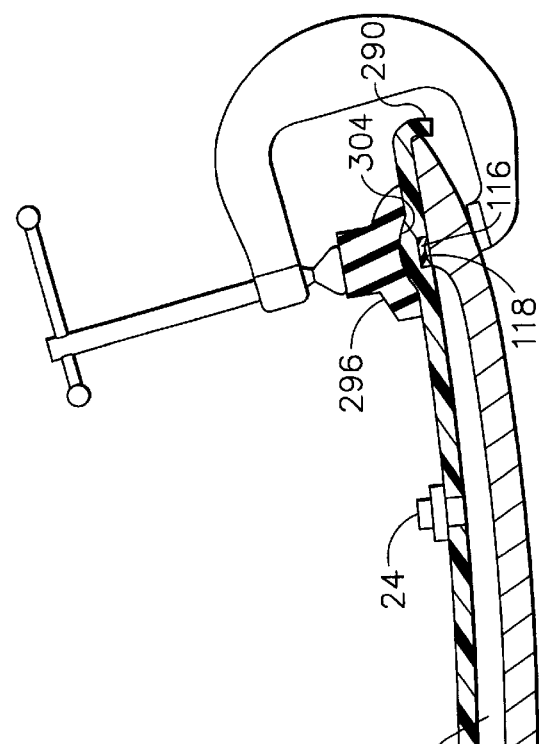
FIG. 10 is a cross section of a caul sheet assembled to a fan blade at room temperature.
Figure 10:
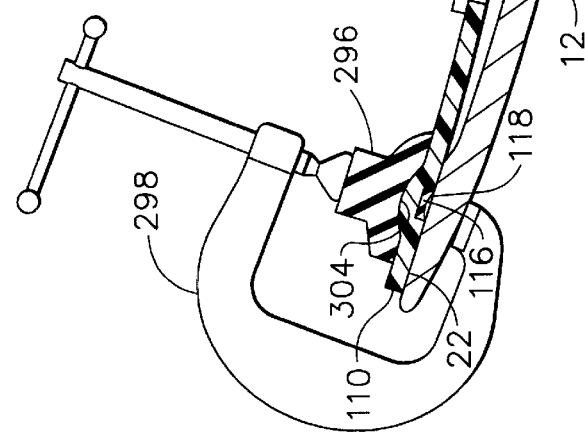

In use, caul sheet 110 is assembled to fan blade 12 having pockets 14, as shown in FIG. 10 by placing each of lugs 290 around the edge of the blade along a perimeter. This placement basically aligns blade 12 with the caul sheet 110. Prior to filling pockets 14 with lightweight material 302 in the form of a lightweight, flowable, curable liquid, the assembly is heated to a temperature in the range of 220–250° F. (104–121° C.) to expand seal 116 against pressure side 22 of blade, as shown in FIG. 11.

To facilitate and assure fit-up during addition and curing of lightweight material 302, after caul sheet 110 is aligned on blade 12, a plurality of clamping blocks 296 are assembled onto caul sheet 110 to facilitate the use of clamps 298 to secure caul sheet 110 to blade 12 while lightweight material 302, shown in FIG. 11, is injected into pockets 14 after elastomeric seal 116 has been expanded into contact against pressure side 22 of the blade. In the preferred embodiment, each of clamping blocks 298 have a contoured surface 304 corresponding to the contour of node 280. Clamping blocks, however, are not required to completely cover node 280 around the perimeter of the airfoil, but are present in a plurality of discrete locations around the assembly. Although the caul sheet 110 may be heated before assembling to blade 12, in a preferred embodiment the caul sheet is assembled and clamped to the blade, and the clamped assembly is heated. This assures the proper expansion of seal 116 against pressure side 22.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A caul sheet for use in the manufacture of a metallic airfoil having cavities filled with a lightweight material component, the metallic airfoil having a leading edge, a trailing edge, a tip end and a shank portion, the airfoil having a pressure side extending between the leading edge, the trailing edge, the tip end and the shank portion, the caul sheet comprising:

a flexible body of composite material having a predetermined thickness sufficient to provide a predetermined stiffness, the body having a profile that matches the profile of the pressure side of the metallic airfoil when assembled over the pressure side of the airfoil;

an integral elastomeric seal having a concave profile at room temperature that extends around a perimeter of the flexible body; and at least one injection port that extends across the flexible body to permit the transfer of flowable lightweight resin across the flexible body when the caul sheet is assembled to the airfoil.

2. The caul sheet of claim 1 further including at least two lugs for positioning the caul sheet over the pressure side of the airfoil.

3. The caul sheet of claim 2 wherein at least one lug positions the caul sheet over the tip end of the airfoil and wherein at least one lug positions the caul sheet over the leading edge of the airfoil.

4. The caul sheet of claim 3 wherein at least one lug positions the caul sheet over the tip end of the airfoil and wherein at least one lug positions the caul sheet over the trailing edge of the airfoil.

5. The caul sheet of claim 1 wherein the integral elastomeric seal expands sufficiently when heated to form a seal against the pressure side of the airfoil prior to injection of lightweight material into the at least one injection port and returns to the concave profile upon cooling to room temperature.

6. The caul sheet of claim 1 wherein a material of the integral elastomeric material is selected from the group consisting of urethane rubbers, fluorosilicon rubbers and fluorocarbon rubbers.

7. The caul sheet of claim 1 wherein the flexible body of composite material is a fiber reinforced epoxy matrix.

8. The caul sheet of claim 7 wherein the fiber is selected from the group consisting of carbon fiber, silicon carbide fiber, kevlar fiber, and sapphire fiber.

9. The caul sheet of claim 1 wherein the flexible body of composite material includes graphite fiber embedded in a fiber reinforced epoxy matrix.

10. The caul sheet of claim 1 wherein the flexible body of composite material having a predetermined thickness sufficient to provide a predetermined stiffness further comprises a plurality of plies of composite material, each ply of the composite material including unidirectional fiber reinforcement in a plastic resin matrix, the plurality of plies arranged in quasitropic arrangement prior to curing, such that the fibers in the caul sheet form a pattern of alternating orientation.

11. The caul sheet of claim 1 wherein the flexible body of composite material having a predetermined thickness sufficient to provide a predetermined stiffness further comprises a plurality of plies of composite material, each ply of the composite material including woven fiber reinforcement in a plastic resin matrix such that the fibers in each ply have a bidirectional orientation.

* * * * *